June 17, 1969

G. WICENEC 3,449,972

INFINITELY VARIABLE TRANSMISSION WITH OVERRIDING CLUTCH

Filed Jan. 25, 1967

INVENTOR.
GOTTFRIED WICENEC
BY

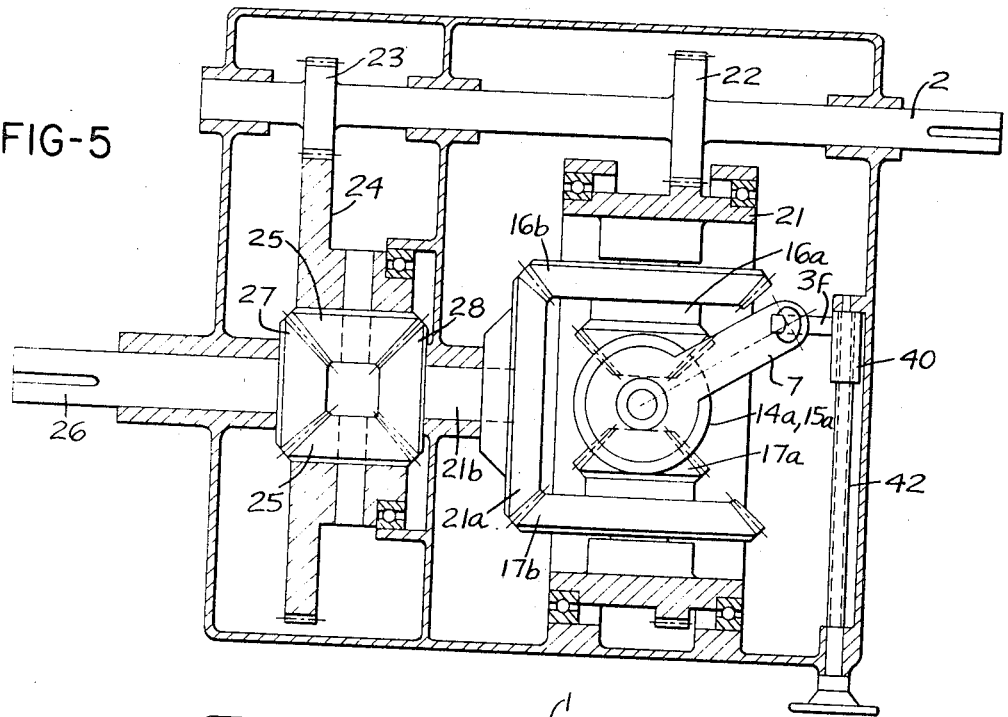
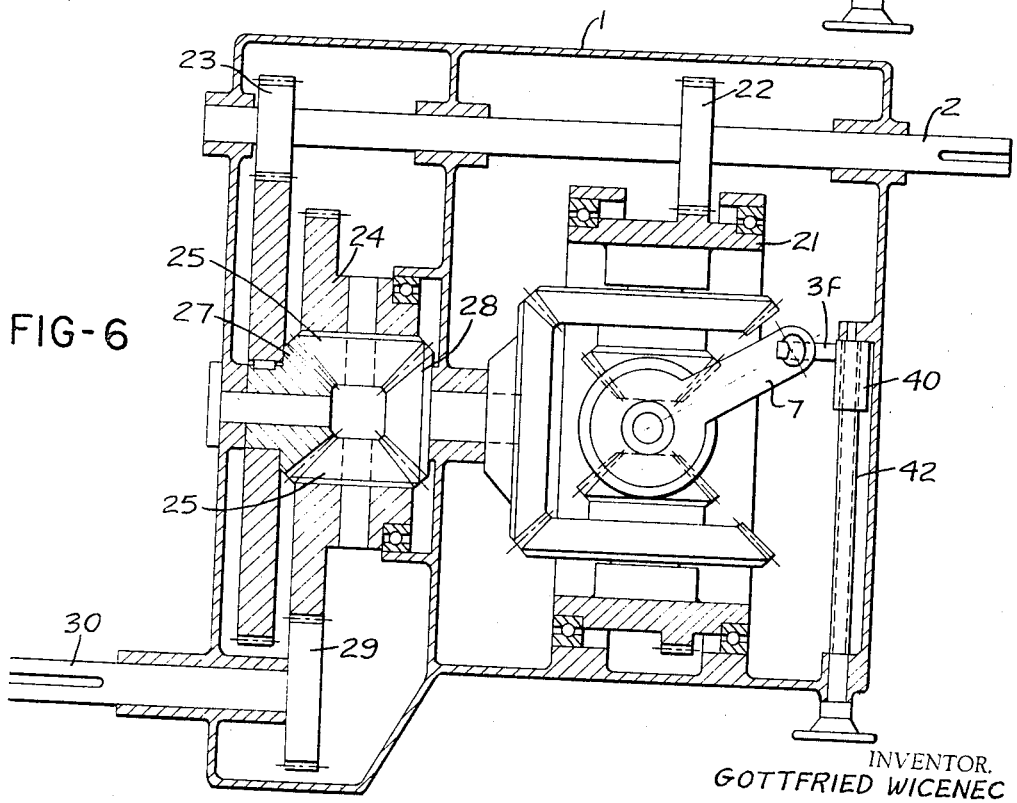

United States Patent Office 3,449,972
Patented June 17, 1969

3,449,972
INFINITELY VARIABLE TRANSMISSION WITH OVERRIDING CLUTCH
Gottfried Wicenec, Beckum, Germany, assignor to Julius Meimberg, Munster, Germany
Filed Jan. 25, 1967, Ser. No. 611,678
Int. Cl. *29/08*
U.S. Cl. 74—119  10 Claims

ABSTRACT OF THE DISCLOSURE

The invention relates to a variable speed transmission in which rotation of an input member causes oscillation of a drive element connected by way of a pair of reversely operating overrunning clutches with an output member with means for varying the stroke of the oscillating member to vary the drive ratio of the transmission and with gearing interposed between the overrunning clutches and the output member.

---

The present invention relates to an infinitely variable transmission with overriding clutch.

The heretofore known controlling transmissions including overriding clutches or return feed-locking mechanisms operate with a plurality of clutches of which each one is adapted for a short period of time to transmit power, namely, when it has reached the relative maximum turning speed. Nevertheless, each of the return feed-locking mechanisms or clutches has to be dimensioned in conformity with the maximum output torque. This is expensive in the first place, and secondly, with higher output speeds, depending on the number of clutches, causes nonuniform movements of rotation. This nonuniformity in its turn brings about an increased stress to which the clutches are subjected because these clutches have to absorb at least one shock for each revolution. With various transmission constructions, an effort is made to counteract the said uniformity of the output by correspondingly profiled cam wheels. This is likewise rather expensive as far as production is concerned, and moreover such structures are sensitive to wear.

Other transmissions contain a lever system with elbow lever or control lever between the input shaft and the override clutch. These systems have an effect which is similarly to that produced by the cams, and such systems are effective only for one direction of rotation of the drive, but are not uniformly effective over the entire control range.

Finally, transmissions are known which put up with a certain nonuniformity of the output speed in order to get by with an economically feasible number of overriding clutches or return feed-locking mechanisms. In this connection it is to be noted that with increasing number of overriding clutches, also the size of the transmission increases.

Purely hydraulically working transmissions have a poor degree of efficiency at a relatively low step-down ratio. A hydraulic motor and a hydraulic pump are required, in other words two units. Friction wheel transmissions require high circumferential speeds and thus can be interposed only between the motor and a transmission. In this instance, there exists no possibility to obtain low output speeds while employing relatively low-cost mass-produced transmission motors by the insertion of subsequent control transmissions. Wide V-belt transmissions with control discs cannot effect a control from zero on and have to have a relatively high belt speed, moreover they are bulky in construction and cannot exert a control when at a standstill. Similarly, transmissions of the type of the well known PIV transmissions with chain and groove discs cannot effect a control at a standstill and from zero.

It is, therefore, an object of the present invention to provide an infinitely variable transmission which employs overriding clutches and in which the number of the clutches will be reduced to a minimum while, nevertheless, a uniform output speed will be obtained over the entire control range from zero to a maximum.

It is another object of this invention to provide a transmission as set forth in the preceding paragraph which will be equipped with structural members which can easily be produced with customary tools and machine tools.

It is still another object of this invention to provide a transmission as set forth above, which has a high degree of efficiency.

These and other objects and advantages of the invention will appear more clearly from the following specification in connection with the accompanying drawings, in which:

FIGURE 1 diagrammatically illustrates a vertical section through a first embodiment of a transmission according to the present invention.

FIGURE 5 is a horizontal section through still another modification according to the present invention.

FIGURE 6 is a horizontal section through a modification of the invention.

Figure 1:
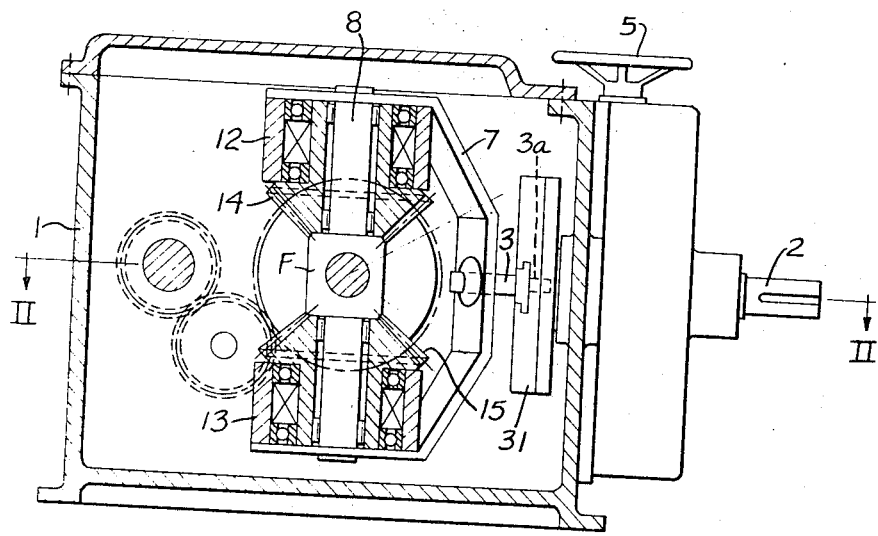

The objects outlined above have been realized by converting a circular movement into a wobbling movement which latter is spread up into two rotary oscillations offset by 90° with regard to each other. The counter-running half-waves of said rotary oscillations are rectified, added, and imposed upon the output shaft through the intervention of overriding clutches. Furthermore, according to the present invention, four overriding clutches or the like, are rotatably journalled on the arms of shafts crossing each other. These four overriding clutches are in mutual matching engagement through the intervention of double gears or the like. Furthermore, the two outer rings of the clutch are on one of the shafts interconnected by a yoke member which is placed into wobbling movement by a crank pin having a variable radius.

The way of operation of the transmission according to this invention differs considerably from the principle of conventional transmission, inasmuch as, the free-wheel drives are engaged not only during the short time during which they rotate faster than on the other free-wheel drives but they are engaged during the entire positive half-wave regardless of their respective speed.

While one oscillatory movement may have, for instance, the velocity zero, the other oscillatory movement moves at the maximum speed. The change in speed over a time period is so selected that at any time the sum of these speeds will have a constant preselectable value. Thus, for instance, the following conditions may prevail:

| 1 | 2 | Velocity | Total |
|---|---|---|---|
| 0 | 10 | | 10 |
| 1 | 9 | | 10 |
| 2 | 8 | | 10 |
| 3 | 7 | | 10 |
| 4 | 6 | | 10 |
| 5 | 5 | | 10 |
| 6 | 4 | | 10 |
| 7 | 3 | | 10 |
| 8 | 2 | | 10 |
| 9 | 1 | | 10 |
| 10 | 0 | | 10 |

The constant velocity total is imposed upon the output shaft.

For a uniform output speed, heretofore conventional transmissions required a plurality of free-wheel drives because only four free-wheel drives furnish a non-uniform output movement so that higher outputs cannot be transmitted in view of the occurring shocks in the free-wheel drives.

In contrast thereto, already four free-wheel drives in a transmission according to the invention, furnish a completely uniform output speed. Moreover, the power absorption from one free-wheel drive to the other free-wheel drive is effected at the dead of the course of the speed of the partial oscillations, i.e. at a point at which both parts of the free-wheel drive have the same speed. Beats and shocks, due to different speeds of the outer and inner links of the free-wheel drives can thus not occur. This greatly increases the life of the free-wheel drives.

Instead of the yoke initiating the drive, and instead of a crank case with variable radius, it is also possible according to the present invention, to journal the two pairs of clutches in one housing which itself carries out a rotary movement while the crank pin is fixedly journalled. The rotary movement of the basket can be derived either from the input or from the output side.

Referring now to the drawings in detail, the transmission proper is arranged in the housing 1 into which leads a drive shaft 2 adapted to be driven by an engine (not shown in the drawing). Mounted on shaft 2 within housing 1 is a crank pin 3 which is adapted, for instance, by means of a planetary gear drive 4 to be adjusted by a hand wheel 5, also during the operation of the device. In this way, it will be possible to vary the radius of the crank pin 3 between the value R=Zero and R=Maximum. The crank pin 3 is received by a ball point 6 which is journalled in a yoke 7 at the zenith portion thereof. Within housing 1 there are arranged shafts 8 and 9 on axes which cross each other in a frame F. In the particular embodiment shown in FIGURES 1 and 2, shaft 8 is freely rotatable about shaft 9, whereas shaft 9, as will be evident from FIGURE 2 is rotatably journalled in corresponding bearings 10 and 11 in the housing cover or in the housing wall. Shaft 8 carries two overriding clutches of which the outer rings 12 and 13 are operatively connected to the ends of yoke 7, in other words, the outer rings 12 and 13 are fixedly connected to the ends of yoke 7, whereas the inner rings 14 and 15 of the said overriding clutches each carry a bevel gear and are rotatable on shaft 8. When yoke 7 carries out a tilting movement, the free-wheel drive moves in the same direction of rotation.

Shaft 9 likewise carries two free-wheel drives, while the inner rings 16 and 17 are likewise connected to a bevel gear and are adapted to rotate on shaft 9. The outer rings 18 and 19 of these overriding clutches are operatively connected to the output shaft proper 20 through the intervention of corresponding gears. The connection between the outer rings 18 and 19 with the output shaft 20 is so effected that while being able to rotate at the same speed they rotate in opposite direction.

Seen from the center of the shafts crossing each other, all four overriding clutches permit a rotation in one direction only, while blocking a rotation in the opposite direction. The operation of this transmission is such that when crank pin 3 is put into movement, for instance, by driving shaft 2, yoke 7 will carry out a wabbling movement which is composed of an oscillation in the plane of shaft 8 and an oscillation in the plane of shaft 9. Inasmuch as yoke 7 operates about a point, these oscillations are converted in rotary oscillations the rotary angle of which is a function of the respective amplitude of pivot 3, said oscillations showing a phase displacement of 90°. These oscillations are positive with a pair from zero to 180° and a negative from 180° to 360° with the same pair, whereas with the other pair, said oscillations are positive from 90° to 270° and are negative from 270° to 90°. In view of the blocking effect of the free-wheel drives, the negative rotary oscillations are rectified. Inasmuch as all four bevel gears are in mutual engagement with each other, the rectified rotary oscillations are added.

It can be proved that the total of the rotary velocities at constant crank radius and constant output speed is constant and that the step-down ratio is inversely proportional to the crank radius.

In addition to the said four bevel gears and the two outer rings of the overriding clutches, all movable parts carry out rotary movements of constant angular velocity. The oscillating masses composed of a rotary oscillation in the plane of shaft 8 and an oscillation of the yoke mass in shaft 9 can be fully compensated for by oscillating masses which for the sake of simplicity have not been shown.

Figure 2:
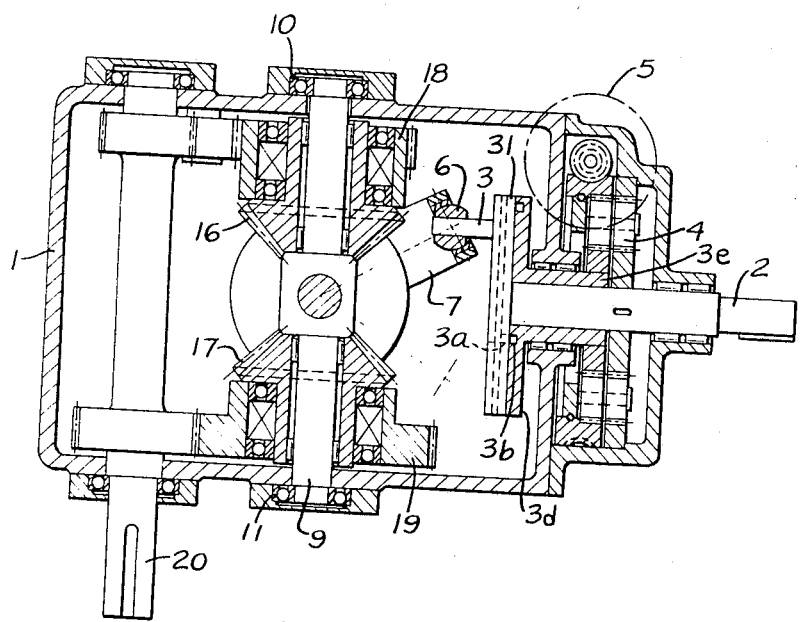
FIGURE 2 is a diagrammatic horizontal section through a first embodiment of FIGURE 1, said section being taken along the line II—II of FIGURE 1.
Figure 3:
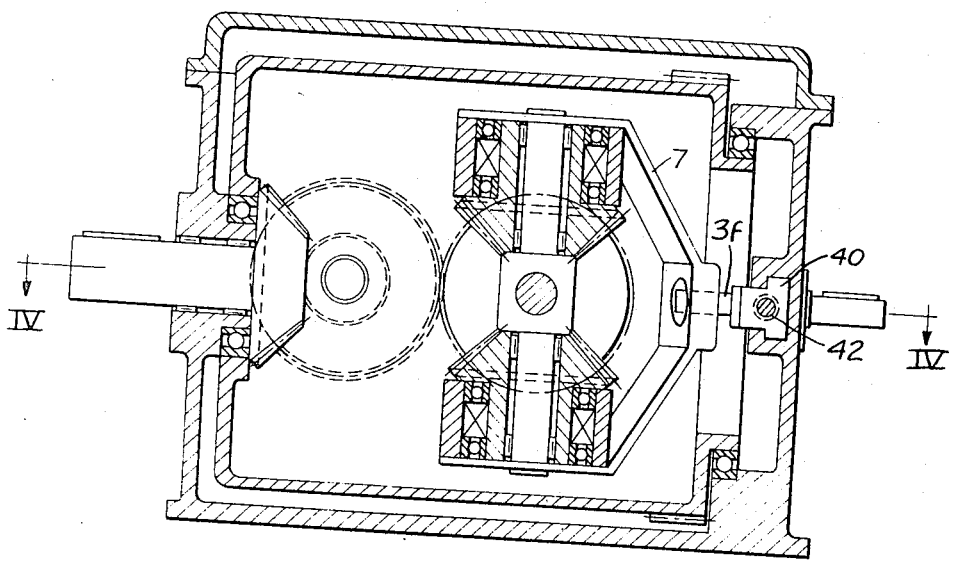
FIGURE 3 is a vertical section through a modified transmission according to the present invention.
Figure 4:
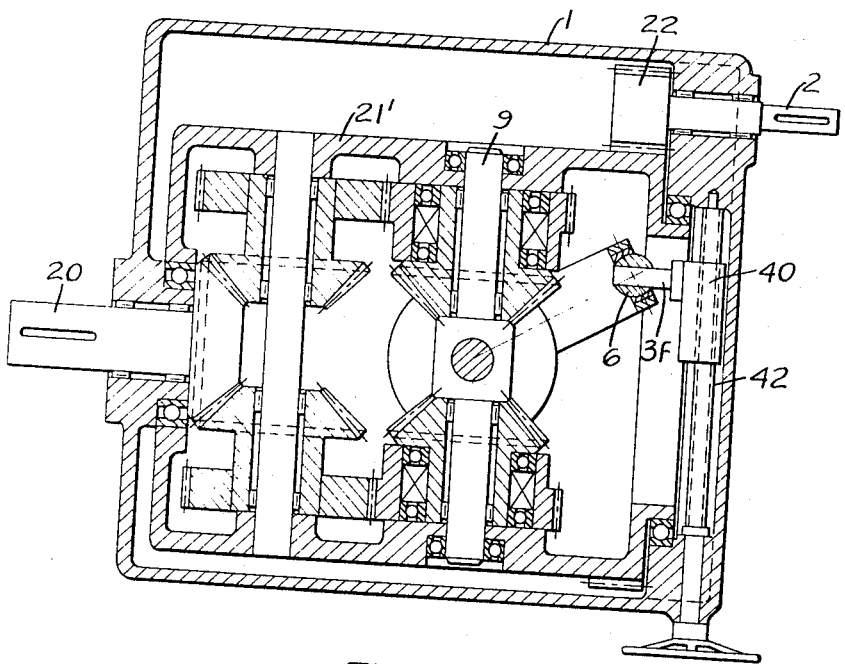
FIGURE 4 is a section taken along the line IV—IV of FIGURE 3.

FIGURES 3 and 4 show an embodiment of the present invention which differs from that of FIGURES 1 and 2 primarily in that yoke member 7 does not carry out a wabbling movement. Instead the ball joint 6 is according to the embodiment held fast, whereas shaft 9, which according to FIGURES 1 and 2, is fixedly journalled in housing 1, is now journalled in a basket 21' adapted to be driven, for instance, through the intervention of a gear 22 by means of a shaft 2. In this instance, the output is effected through a pair of bevel gears. This arrangement has the advantage that the control device is considerably simpler, and that a balancing of the masses up to a relatively high speed will not be necessary.

The embodiment of FIGURE 5 concerns a transmission of the same operation as that of FIGURES 3 and 4 with the difference that by means of a subsequent differential drive, the controllable speed range can be displaced between any two selected speeds.

In FIGURE 5, yoke 7 is connected to gears 14a, 15a by overrunning clutches while gears 16a, 17a with which gears 14a, 15a mesh are connected with the larger bevel gears 16b, 17b by other overrunning clutches. Gears 16b, 17b mesh bevel gear 21a on shaft 21b which also carries bevel gear 28.

The operation is as follows:

Mounted on the extended input shaft 2 is a second driving gear 23 which is adapted to drive the ring 24 with the satellite gears 25. Gears 25 mesh on one hand with bevel gear 27 of output shaft 26, and on the other hand, with bevel gear 28 which is keyed to the output shaft 21b of the control system 21.

When ring 24 is driven at half the speed of the control system 21, the transmission will control from zero on. At other speed ratios, the control range is changed accordingly, so that the output speed can also become negative. By means of such a drive, it is possible to lower loads without changing the direction of the driving shaft.

The transmission illustrated in FIGURE 6 is particularly suitable for the drive of vehicles and other engines which have a difficult start. Engines and vehicles which have a relatively hard start are for the majority of the time driven at their highest speed. A control is required only during the starting of the engines, i.e. at the lowest speeds in order to adapt the driving engine to the starting condition. The life of the transmission of such engines can be extended multifold if the control system does not any longer have to run at the highest driving speed.

The characteristics of the engine according to the present invention permits this reversal of the operation of the control system by the subsequent arrangement of a differential transmission. FIGURE 6 illustrates the structure of such a transmission. The build up is similar to the transmission according to FIGURE 5. The difference consists primarily in that the second pinion 23 of the drive shaft does not drive the ring 24 with the satellite wheels 25 but, instead, drives the bevel gear 27 which, in FIG- URE 6, is not mounted on the output shaft. The output speed, on the other hand, is conveyed by ring 24 through gears 28 and 29 to the output shaft 30. It will be evident from the above that at the highest output speed the eccentricity of the control pivot equals zero, while the overriding clutches are out of action.

An automation of the control operation can be realized by coupling the output speed and/or the torque of the transmission or of the vehicle speed to the eccentricity of the control pivot.

This coupling does not have to be linear, and further control members may be installed in conformity with requirements, which control members will be able to influence the degree of the coupling.

It is also to be mentioned that in contrast to the conventional shiftable transmissions the output speed of the transmission according to the invention is not composed of the individual maximum speed of the free-wheel drives, but that the free-wheel drives or overriding clutches are engaged within the range of 180° with regard to the input shaft. As free-wheel or overriding clutches also other structural elements may be employed as, for instance, hydraulic locks which in principle are short-circuited oil pumps having check valves or input shaft control valves interposed in the short-circuiting conduit. Furthermore, also mechanical clutches with mechanical, electric, pneumatic, or hydraulic control, or purely electric couplings may be employed. Control couplings permit a simpler reversal of the direction of rotation. Furthermore, they may be designed for considerably higher output. It should also be noted that a transmission with control clutches can be disengaged without additional clutches.

Since the shifting of the clutches is effected always at the dead center point of the two partial oscillations, there is sufficient time available, and the effect of a slight early or late shifting is not significant with regard to the angular velocity of the output shaft.

Furthermore, the advantages of the transmission according to the invention, with control clutches consists in that they are power connected, i.e. have no free-wheel drive.

According to the preceding description, the output speed is obtained by adding two oscillations of the same direction. If in this transmission, the locking device reverses a pair of clutches, the oscillations will be added for half a revolution of the input shaft and will be substracted during the other half of the revolution.

The output shaft will thus rotate in forward direction stepwise. A uniform forward movement is followed by intermission of an absolute standstill. This type of operation is frequently required with automating oscillations and generally calls for considerable individual structural members.

With reference to FIGURES 1 and 2, pin 3 is fixed to a slide that is guided diametrally of plate 31 of shaft 2. A pin 3a on the slide extends into spiral groove 3b in plate 3d on tubular shaft 3e. The planetary gear drive 4 comprises a sun gear on each of shafts 2 and 3e. These sun gears are the same size and each meshes with planet gears of the same size. The planet gears are mounted on a common carrier and respective ring gears are provided therefor with one being fixed in the housing and the other being adjustable as to its rotated position in the housing by hand wheels. Shafts 2 and 3e thus normally rotate as a unit but can be rotatively adjusted relating to each other.

In FIGURES 3, 4, 5 and 6, the pin 3f, which corresponds to pin 3 of FIGURES 1 and 2, is mounted in a block 40 threaded on a spindle 42. Block 40 is guided in straight line movement in a plane passing through the center of the differential unit.

Spindle 42, block 40 and pin 3f form the equivalent of the crank of FIGURES 1 and 2 of which pin 3 forms a part. The center of the crank of FIGURES 1 and 2 is a third axis perpendicular to the axes of shafts 8 and 9 at the point of intersection thereof, and adjustment of the crank adjusts pin 3 parallel to this third axis in the plane thereof.

Similarly, spindle 42, block 40 and pin 3f are a part of a crank system having a theoretical axis perpendicular to the axes of the differential control units at the point of intersection thereof and which crank system is adjustable to adjacent pin 3f in parallelism to the said theoretical axis in the plane thereof.

What is claimed is:

1. In an infinitely variable transmission; rotatable input means, rotatable output means, drive means interposed between said input means and said output means and connected to be driven by said input means and to drive said output means, said drive means including a frame having first and second axes intersection at right angles, an oscillatory member supported on said frame for oscillation thereon about said first axis, said frame being supported for oscillation about said second axis and being oscillatable about said second axis together with said oscillatory member, a crank pin engaging said oscillatory member, said input means actuating said crank pin and said frame in relative rotation, a pair of elements on each said axis, said elements being drivingly interconnected to rotate in unison on their respective axes, first overrunning clutches between said oscillatory member and the said elements on said first axis effective in respective directions of oscillation of said member, and second overrunning clutches between the elements on said second axis and said output means and effective in respective directions of rotation of said second elements.

2. A transmission according to claim 1 in which a pair of shafts at right angles to each other define said first and second axes, said elements comprising bevel gears on said shafts, a crank having its theoretical center on an axis perpendicular to and intersection said first and second axes and having the said crank pin engaging said oscillatory member thereon, and said oscillatory member comprising a yoke having the ends of its arms connected to said frame at the ends of the shaft defining said first axis and having means in about the middle thereof engaging said crank pin.

3. A transmission according to claim 2 in which said crank is adjustable to adjust the distance of said crank pin from said third axis.

4. A transmission according to claim 3 in which said transmission includes a housing, the said frame being supported in said housing for oscillation about said second axis, and said input means driving said crank in rotation.

5. A transmission according to claim 3 in which said transmission includes a housing, a second frame rotatable in said housing and connected to said input means to be driven thereby, said first mentioned frame being supported in said second frame for oscillation therein on said second axis, said crank being non-rotatively mounted in said housing.

6. A transmission according to claim 3 in which said output means comprises a shaft driven by said second overrunning clutches, and a differential transmission having a first input member driven by said shaft and a second input member driven by said input means and also having an output member.

7. A transmission according to claim 6 in which said output member has its greatest speed at the smallest eccentricity of said crank and its smallest speed at the greatest eccentricity of said crank.

8. A transmission according to claim 3, in which control means is provided for effecting the adjustment of said crank pin to adjust the eccentricity of said crank, said control means being dependent upon speed of said output means operatively interconnected to said control means.

9. A transmission according to claim 3, in which said overrunning clutches are controllable at least in part by adjustable location of said crank pin engaging said oscillatory member.

10. A transmission according to claim 9, in which a control system including at least a differential transmission is operatively associated with said overrunning clutches for reversible operation of said control system.

References Cited

UNITED STATES PATENTS

| | | | |
|---|---|---|---|
| 632,591 | 9/1899 | Simpson | 74—119 |
| 908,697 | 1/1909 | Pupke | 74—679 |
| 968,482 | 8/1910 | Kraeger | 74—119 |
| 1,045,582 | 11/1912 | Messer | 74—119 |

CARLTON R. CROYLE, *Primary Examiner.*

A. D. HERRMANN, *Assistant Examiner.*

U.S. Cl. X.R.

74—675, 679